(12) United States Patent
Fritz et al.

(10) Patent No.: US 6,458,187 B1
(45) Date of Patent: Oct. 1, 2002

(54) SHAPED BODY OF ZEOLITE, A PROCESS FOR ITS PRODUCTION AND ITS USE

(75) Inventors: Hans-Gerhard Fritz, Uhingen (DE); Christian Trefzger, Durham, NC (US); Hans Hermann Höfer, Westhofen (DE)

(73) Assignee: Grace GmbH & Co. KG, Worms (DE)

( * ) Notice: Subject to any disclaimer, the term of this patent is extended or adjusted under 35 U.S.C. 154(b) by 0 days.

(21) Appl. No.: 09/647,697

(22) PCT Filed: Mar. 31, 1999

(86) PCT No.: PCT/EP99/02365

§ 371 (c)(1),
(2), (4) Date: Nov. 6, 2000

(87) PCT Pub. No.: WO99/49964

PCT Pub. Date: Oct. 7, 1999

(30) Foreign Application Priority Data

Mar. 31, 1998 (DE) .......................................... 198 15 564
Jun. 8, 1998 (DE) .......................................... 198 26 209

(51) Int. Cl.[7] .................................................. B01J 20/16
(52) U.S. Cl. ............................. 95/117; 95/130; 95/135; 210/660; 502/62; 502/232
(58) Field of Search ................................ 96/108; 95/90, 95/117, 130, 135; 210/660; 502/60, 62, 63, 64, 232

(56) References Cited

U.S. PATENT DOCUMENTS

| 4,594,332 A | | 6/1986 | Hoelderich et al. ............ 502/64 |
| 4,637,995 A | * | 1/1987 | DeAngelis et al. ............ 502/64 |
| 5,316,993 A | * | 5/1994 | Sextl et al. .................... 502/68 |
| 5,492,883 A | | 2/1996 | Wu ............................... 502/439 |
| 6,171,568 B1 | * | 1/2001 | Sextl et al. .................... 502/60 |

FOREIGN PATENT DOCUMENTS

| DE | 3231498 | 3/1984 |
| DE | 3738916 | 5/1989 |
| DE | 4202671 | 12/1992 |
| EP | 700 718 | 3/1996 |
| EP | 706 824 | 4/1996 |
| EP | 776 696 | 6/1997 |

OTHER PUBLICATIONS

DATABASE WPI; Section Ch, Week 8311; Derwent Publications Ltd., London GB; Class A81, AN 83–25805K; XP002107087 & JP 58 017833 A (Kyoritsu Yogyo KK); Feb. 2, 1983.

* cited by examiner

*Primary Examiner*—David A. Simmons
*Assistant Examiner*—Frank M. Lawrence
(74) *Attorney, Agent, or Firm*—Charles A. Cross (57) ABSTRACT

A shaped zeolite-containing body, e.g., zeolite-containing monoliths, having high compressive strength is prepared from a particular class of siloxane-based binders in combination with zeolite, plasticizing agent, and methylcellulose. It has been discovered that when using the particular class of siloxane binder with the aforementioned components, the body formed therefrom can be processed and calcined at temperatures below 300° C., thereby reducing costs typically seen with other processes for preparing shaped materials containing zeolite. The shaped bodies of this invention have been shown to have compressive strengths of at least 20 N/mm$^2$ or more.

41 Claims, 9 Drawing Sheets

SHAPED BODY OF ZEOLITE, A PROCESS FOR ITS PRODUCTION AND ITS USE

This application is a 371 of PCT application No. PCT/EP99/02365 filed on Mar. 31, 1999.

FIELD OF THE INVENTION

The present invention relates to a shaped body which has been produced from a reaction mixture comprising zeolite, plasticizing agent and binder. The present invention furthermore relates to a process for the production of such a shaped body and to its use.

BACKGROUND

Zeolites are crystalline microporous materials of defined pore structure. These find diverse industrial applications in the form of fixed beds in bulk form, for example for drying gases, removal of volatile organic hydrocarbons from waste air streams and separation of hydrocarbon fractions.

A disadvantage of the use of fixed beds in bulk form of zeolite is, above all, the abraded material obtained during operation. This undesirable dust-like abraded material impairs functioning of fittings and apparatuses located downstream. Furthermore, when gases flow through, fixed beds in bulk form show pressure losses which are significantly greater compared with zeolitic honeycombed bodies and can vary during operation.

In order to be able to originally form zeolitic powders into shaped bodies, it is necessary to add to the powder, in a compounding step, additives which impart to the moulding composition a certain plasticity, which in turn is a prerequisite for the subsequent shaping process. After shaping has been concluded, it should be possible to remove the plasticizing agent from the form produced, such as, for example, an extrudate, as far as possible without residues, because even small amounts of foreign substances impair the sorptive and catalytic properties of the zeolitic shaped body produced. To obtain a dimensionally stable shaped body, it is furthermore necessary to add a binder to the moulding composition. During the subsequent calcining, this binder decomposes to form bridges of solid.

A process for the production of hard, break-proof catalysts from zeolites of the pentasil family is described, for example, in DE 32 31 498 A1. Tetramethyl orthosilicate (TMOS) is used here as the binder in an amount of 5%. The plasticizing agent is hydroxyethylcellulose, which is employed in an amount of 2%. After this mixture has been kneaded, it is transferred to an extruder and extruded to strands. After the shaped body produced in this way has been dried, it is calcined at temperatures in a range from 400° C. to 800° C. for 2 hours.

A disadvantage of the process described in this publication is, above all, that because of the high temperatures and the long calcining time, the production of the zeolitic shaped bodies is very cost-intensive. The fact that mixing of the moulding composition and extrusion are carried out in separate steps is also a contributing factor to this. The binder tetramethyl orthosilicate described in this publication furthermore is a small molecule which is deposited inside the pentasil zeolites, blocks these and therefore impairs their sorptive and catalytic properties.

DE 37 38 916 A1-describes molecular sieve shaped bodies of zeolites in which silica sol is primarily used as the binder, the $SiO_2$ particles contained in this silica sol having a specific surface area, measured by the BET method, of 150 $m^2/g$–400 $m^2/g$. Moulding compositions of a mixture of silica sol with a mixture of ethyl esters of methylsilicic acids are furthermore described, the latter being added to the silica sol in small amounts. Lubricants which allow a fine rheological adjustment of the moulding composition recipe used are added to the moulding compositions. The molecular sieve shaped bodies comprise zeolites of the Y type or mordenite type. The molecular sieve shaped bodies are produced by extrusion, the moulding composition first being mixed and kneaded and then being transferred to the extruder in a second step. The calcining is carried out at 500° C. to 800° C.

It is a decided disadvantage of the molecular sieve shaped bodies described in DE 37 38 916 A1 that they are produced in a discontinuous process at very high temperatures. As a result, the production costs of the shaped bodies increase considerably. It is furthermore a disadvantage that in the mixture used, of silica sol with ethyl esters of methylsilicic acids, the silica sol is present in colloidal form. It is therefore not possible to form a continuous matrix. The solid binder can be distributed poorly compared with the binder present in liquid form. Finally, expensive lubricants are added.

Zeolitic shaped bodies produced by extrusion in the form of honeycombed bodies are not yet commercially obtainable.

SUMMARY OF THE INVENTION

The object of the present invention is to provide a shaped body based on zeolite and a process for its production, which avoid the known disadvantages and at the same time in particular are inexpensive.

This object is achieved according to the invention in that the shaped body is produced from a reaction mixture which comprises zeolite, plasticizing agent and binder, the binder comprising a compound of the formula (I)

in which
- R in each case independently is unsubstituted or substituted alkyl, aryl, alkenyl, alkinyl, alkoxy or phenoxy,
- R' in each case independently is unsubstituted or substituted alkyl, aryl, alkenyl or alkinyl and
- n is a number from 1 to 10, preferably 3 to 6, more preferably 3 or 4, the zeolite comprises zeolite 3A, zeolite 4A, zeolite 5A or zeolite X or any desired mixture of the abovementioned types of zeolite, and
the plasticizing agent comprises methylcellulose and is present in the reaction mixture in a content of about 5 to about 40 wt %, based on the total reaction mixture.

DETAILED DESCRIPTION

Preferably,

R in each case independently is unsubstituted or substituted $C_1$- to $C_{20}$-, preferably $C_1$- to $C_{10}$-, and in particular $C_1$- to $C_5$-alkyl, $C_6$- to $C_{20}$-, preferably $C_6$- to $C_{15}$-, and in particular $C_6$- to $C_{10}$-aryl, $C_2$- to $C_{20}$-, preferably $C_2$- to $C_{10}$-, and in particular $C_2$- to $C_5$-alkenyl, $C_2$- to $C_{20}$-, preferably $C_2$- to $C_{10}$-, and in particular $C_2$- to $C_5$-alkinyl, $C_1$- to $C_{20}$-, preferably $C_1$- to $C_{10}$-, and in particular $C_1$- to $C_5$-alkoxy or $C_6$- to $C_{20}$-, preferably $C_6$- to $C_{15}$-, and in particular $C_6$- to $C_{10}$-aryloxy, in particular phenoxy, and R' in each case independently is unsubstituted or substituted $C_1$- to $C_{20}$-, preferably $C_1$- to $C_{10}$-, and in particular $C_1$- to $C_5$-alkyl, $C_6$- to $C_{20}$-, preferably $C_6$- to $C_{15}$-, and in particular $C_6$- to $C_{10}$-aryl, $C_2$- to $C_{20}$-, preferably $C_2$- to $C_{10}$-, and in particular $C_2$- to $C_5$-alkenyl or $C_2$- to $C_{20}$-, preferably $C_2$- to $C_{10}$-, and in particular $C_2$- to $C_5$-alkinyl.

Depending on the value of n, the compound of the formula I is present here as the monomer or in the form of a long-chain, optionally branched oligomer.

The shaped bodies according to the invention advantageously have decidedly high compressive strengths of, for example, 20 N/mm² or more, preferably 30 N/mm² or more, more preferably 50 N/mm² or more. A tensile/compression tester from Zwick, model UP 1455, was employed to determine the compressive strength. For this, completely cylindrical extrudates having a specimen diameter of 5 mm were cut to a specimen length of 7 mm. For exact and reproducible compressive strength measurements, it must be ensured that the front faces of the extrudates are planar-parallel. The measurement is carried out at room temperature. The preliminary force is 1 N. The experiments were carried out at a test speed of 1 mm/min. The test force acts on the front faces.

The shaped bodies according to the invention are highly stable to mechanical stresses and are therefore suitable for diverse possible uses. The shaped bodies according to the invention furthermore have abrasion resistances of more than 99%. The abrasion resistance was measured in accordance with the American Penny Attrition Test (Mitchell W. J.et al., U.S. Pat. No. 2,973,327, 1956): 3 g completely cylindrical zeolitic pellets with D=5 mm and L/D=1.5 were introduced into a closable vessel of plastic. The container was exposed to a frequency of 60 scale units in a Retsch (model 3D) vibratory sieving machine for 20 min. To simulate increased abrasions and a load close to reality, the vessel of plastic additionally contains a 1 Pfenning piece. The abraded material obtained is then separated off with a sieve of mesh width 500 μm at a frequency of 20 scale units over a period of 2 min.

No blockage of or damage to the units or machines downstream of the shaped body by abrasion, such as occurs, in particular, with fixed beds in bulk form based on zeolite, occurs. This makes the shaped bodies according to the invention particularly suitable for long-term use in industrial devices. The resulting elimination of changing of the zeolite material, which is necessary with fixed beds in bulk form, reduces the operating costs of the devices in which the shaped body according to the invention is used. In addition, by using the shaped bodies according to the invention, a significantly lower and more defined pressure loss can additionally be achieved, which considerably facilitates design thereof for the particular intended use.

Surprisingly, it has been found that the shaped body according to the invention can be calcined in an optimum manner at temperatures below 300° C., preferably in a temperature range from about 180° C. to about 280° C. This temperature is far outside the hitherto customary range described in the prior art. As a result, it is possible for the production costs of the shaped body according to the invention to be reduced drastically.

The zeolites mentioned can be prepared decidedly inexpensively and furthermore have diverse uses, for example as drying and separating agents for gases or organic liquids.

Preferably, in the siloxane according to the formula (I), n is a number from 3 to 4, the content of radicals R and R'=methyl being greater than that of radicals R and R'=ethyl. The siloxane advantageously has a very high content of methyl groups. Shaped bodies produced using such a siloxane have optimum mechanical, sorptive and catalytic properties.

The binder of the formula (I) used in the shaped body according to the invention simultaneously serves as the lubricant. The internal and external lubricants which are added, according to the prior art, to influence the rheological properties of the moulding composition disadvantageously require a high introduction of shear, and therefore long kneading times, in the production process to achieve a uniform distribution, which drives up the production costs of the shaped bodies produced therefrom. Since reaction mixtures according to the invention with the compound of the formula (I) have reduced flow limits and low intake pressure losses in the production process, the shaping properties of the reaction mixture are improved considerably and the addition of further lubricants is not necessary.

Compared with fixed beds in bulk form of zeolite, the shaped bodies according to the invention have significantly improved sorption kinetics, especially in the form of honeycombed extrudates, because of the large surface area. The increase in water during measurement of the sorption capacity in a climate cabinet at T=23° C. and a relative humidity of 10% is thus in the range from 13 wt. % to more than 17 wt. %, based on the shaped body, after three hours using a zeolite of type 4A.

It was previously assumed by experts that zeolites cannot be prepared using siloxanes as binders, which are relatively expensive compared with the zeolites used, since these shaped bodies were regarded only as uneconomical to produce. To date, zeolites have been used commercially only in the form of fixed beds in bulk form.

The shaped body according to the invention preferably has a binder having an $SiO_2$ content of about 50 wt. % or more, more preferably about 60 wt. % or more, based on the total binder. At such high $SiO_2$ contents, decidedly high compressive strengths and abrasion resistances are obtained, which render the shaped bodies according to the invention usable for diverse industrial applications.

The binder used for the production of the shaped body according to the invention preferably contains less than about 10 wt. % solvent, based on the total binder. A solvent content of less than 5 wt. % in the binder is more preferred, and still more preferably, the binder is even solvent-free. This allows processing of the binder without taking into account solvent-specific safety precautions. As a result, the production costs of the shaped body according to the invention are reduced further.

The binder furthermore preferably comprises silicone resins. Methylphenylsilicone resin emulsions can be used in particular as silicone resins. The compressive strength values can be adjusted in a controlled manner by the addition of silicone resins.

The silicone resin is preferably solvent-free. A low content of solvents or absence thereof both in the silicone resin and in the siloxane according to formula (I) not only leads to a reduction in the production costs because of lower safety measure requirements, but furthermore deformation of the shaped bodies during the drying process and in the calcining step is also avoided. If binders according to the formula (I) having solvent contents greater than about 10 wt. %, based on the total binder, or solvent-containing silicone resins are used, the rapid evaporation of the solvents in the drying process leads to bubbles and cracks on the honeycombed body surface and to deformation of the extruded shaped bodies by evaporation of the solvent still contained in these, in particular such that after leaving, the side faces of extrudates fall to the centre (shrinkage). In contrast, the shaped bodies according to the invention have a decidedly high dimensional stability during drying and calcining.

The silicone resin preferably has a particle size of about 1 $\mu$m to about 10 $\mu$m. Such silicone resins can be mixed and processed with the zeolites and plasticizing agents and further binders used in an optimum manner.

The shaped bodies according to the invention preferably have a compressive strength of about 20 $N/mm^2$ or higher, more preferably about 30 $N/mm^2$ or higher.

The shaped bodies according to the invention have a maximum compressive strength by calcining in a temperature range from about 180° C. to about 280° C. The calcining temperature is preferably in a range from about 200° C. to about 250° C., more preferably in a range from about 210° C. to about 235° C. Complete crosslinking of the silicone matrix is achieved in these temperature ranges. A maximum number of covalent bridge bonds on which the zeolite is also covalently bonded forms in the calcining process. If the temperatures are increased to above about 280° C., splitting off of the methyl groups from the binder starts, as a result of which the matrix formed is weakened and the compressive strength of the shaped bodies according to the invention decreases. A polymorphic inorganic layer of $SiO_2$ forms. At temperatures below 180° C., on the other hand, crosslinking of the binder and formation of covalent bonds take place only to a minor extent. The values of the compressive strength of the shaped bodies according to the invention which have been calcined within the abovementioned temperature ranges lie far above the compressive strength values of the shaped bodies which have been produced at calcining temperatures outside the temperature ranges stated. Compared with zeolite pellets which are produced on the basis of clay materials, such as attapulgite, or methylated orthosilicates as binders, the compressive strength is several times higher. The high compressive strengths which can be achieved for the shaped bodies according to the invention advantageously mean that the shrinkage to be observed during further heat treatment of the shaped bodies and the intrinsic stresses induced by this in the extrudates are compensated. As a result, cracks or the like in the shaped bodies according to the invention are avoided. An outstanding surface quality and outstanding mechanical properties of the shaped bodies according to the invention result.

The plasticizing agent comprises methylcellulose and is present in the reaction mixture used for preparation of the shaped body in a content of about 5 to about 40 wt. %, based on the total reaction mixture. It may comprise further additonal cellulose ether different from methylcellulose, a polysaccharide, a polyvinyl alcohol, starch or any desired mixture of the abovementioned materials. The plasticizing agent is soluble in water.

If the liquid phase of the reaction mixture, comprising water and plasticizing agent, for production of the shaped bodies according to the invention contains only small contents of plasticizing agent, at least methylcellulose, only an inadequate dimensional stability is obtained after discharge of the extrudate from the extruder. For extrusion of square honeycombed bodies according to the invention with 400 cells/inch$^2$ (approx. 62 cells/cm$^2$), a methylcellulose content of about 10 wt. % or more, more preferably about 15 wt. %, based on the amount of water added, is sufficient. The flow limit is increased and the intake pressure loss of the extrudate is reduced considerably, and a dimensionally stable extrudate is obtained. As a result, a smaller pressure drop along the die is obtained, which means that the back-pressure length in the extruder is reduced. As a consequence, there is less introduction of shear into the pressure build-up zone of the extruder screw. Less heat is dissipated and heating of the zeolitic moulding composition is avoided.

The reaction mixture preferably furthermore comprises wax emulsions and/or fatty acid mixtures as lubricants. A fine rheological adjustment of the shaped bodies according to the invention can be undertaken with these. However, such an adjustment can also be obtained solely by addition of a compound of the formula (I). Since the lubricants are relatively expensive, the production costs of the shaped bodies according to the invention can be reduced further if these are omitted.

The reaction mixture used for production of the shaped bodies according to the invention preferably comprises the binder in a content of about 1 to about 35 wt. %, zeolite in a content of about 40 to about 90 wt. % and the plasticizing agent in a content of about 5 to about 40 wt. %, in each case based on the total reaction mixture. If such reaction mixtures are used to produce the shaped body according to the invention, shaped bodies having outstanding sorptive, catalytic and mechanical properties are obtained. The compound of the formula (I) is preferably present in the reaction mixture in a content of about 2 to about 25 wt. %, more preferably about 5 to about 20 wt. %, based on the reaction mixture. With these amounts, the reaction mixture comprising the compound of the formula (I) has optimum deformation properties during shaping. The shaped bodies according to the invention achieve maximum compressive strength values in this range.

The binder preferably comprises a compound of the formula (I). The production costs of the shaped body according to the invention are reduced by omitting further binders and also lubricants. The shaped bodies according to the invention produced exclusively with a compound of the formula (I) furthermore have excellent sorptive and catalytic properties and mechanical strengths. Due to the outstanding deformation properties of the reaction mixture during the shaping process, low pressure losses are measured along the honeycomb mould (47 bar at m=4 kg/h).

The shaped body according to the invention preferably has the form of a honeycombed body. Honeycombed bodies with a high cell density have an extremely large surface area compared with other shaped bodies, for example in the form of sheets, as a result of which the catalytic and adsorptive properties, in particular the adsorption kinetics, of the shaped bodies according to the invention are improved drastically. The shaped body according to the invention can of course also be produced in the form of tubes, cylinders, beads, tablets, rings, sheets or the like.

The invention furthermore relates to a process for the production of a shaped body obtained from a reaction mixture which comprises zeolite, plasticizing agent and binder of the formula (I)

in which
R in each case independently is unsubstituted or substituted alkyl, aryl, alkenyl, alkinyl, alkoxy or phenoxy,
R' in each case independently is unsubstituted or substituted alkyl, aryl, alkenyl or alkinyl and
n is a number from 1 to 10, preferably 3 to 6, more preferably 3 or 4,
the zeolite being zeolite 3A, zeolite 4A, zeolite 5A or zeolite X or any desired mixture of the abovementiond types of zeolite, and
the plasticizing agent comprises methylcellulose and is present in the reaction mixture in a content of about 5 to about 40 wt. %, based on the total reaction mixture, and
the compound of the formula I being present as the monomer or in the form of a long-chain, optionally branched oligomer, depending on the value of n,
wherein, in this process.
in a first step, a reaction mixture of zeolite, plasticizing agent and binder is prepared;
in a second step, this reaction mixture is extruded; and
in a third step, the extrudate is calcined at a temperature in a range from about 180° C. to about 280° C.
Preferably,
R in each case independently is unsubstituted or substituted $C_1$- to $C_{20}$-, preferably $C_1$- to $C_{10}$-, and in particular $C_1$- to $C_5$-alkyl, $C_6$- to $C_{20}$-, preferably $C_6$- to $C_{15}$-, and in particular $C_6$- to $C_{10}$-aryl, $C_2$- to $C_{20}$-, preferably $C_2$- to $C_{10}$-, and in particular $C_2$- to $C_5$-alkenyl, $C_2$- to $C_{20}$-, preferably $C_2$- to $C_{10}$-, and in particular $C_2$- to $C_5$-alkinyl, $C_1$- to $C_{20}$-, preferably $C_1$- to $C_{10}$-, and in particular $C_1$- to $C_5$-alkoxy or $C_6$- to $C_{20}$-, preferably $C_6$- to $C_{15}$-, and in particular $C_6$- to $C_{10}$-aryloxy, in particular phenoxy, and
R' in each case independently is unsubstituted or substituted $C_1$- to $C_{20}$-, preferably $C_1$- to $C_{10}$-, and in particular $C_1$- to $C_5$-alkyl, $C_6$- to $C_{20}$-, preferably $C_6$- to $C_{15}$-, and in particular $C_6$- to $C_{10}$-aryl, $C_2$- to $C_{20}$-, preferably $C_2$- to $C_{10}$-, and in particular $C_2$- to $C_5$-alkenyl or $C_2$- to $C_{20}$-, preferably $C_2$- to $C_{10}$-, and in particular $C_2$- to $C_5$-alkinyl.

The substantial advantage of the process according to the invention is that the calcining is carried out at temperatures in a range from about 180° C. to about 280° C.

Both commercially obtainable fixed beds in bulk form of zeolite and shaped bodies described in the prior art are calcined at temperatures of at least 400° C. or more, as a general rule at temperatures between 500° C. and 700° C. These high temperatures cause a very high energy consumption during production of the bulk goods or shaped bodies. By avoiding these high temperatures in the process according to the invention, the production costs of the shaped bodies can be reduced drastically.

The shaped bodies calcined in this temperature range furthermore have outstanding mechanical and sorptive properties.

The extrusion can be carried out both in a single- or twin-screw extruder and in a piston extruder.

The first and second step of the process according to the invention are preferably carried out continuously. This continuous procedure, i.e. compounding (preparation) of the individual recipe components and shaping of the moulding composition take place in one step, can be carried out, for example, using a twin-screw extruder with screws rotating in the same direction. In this concept, the densely combing twin-screw extruder with screws rotating in the same direction functions simultaneously as a mixing unit and a pressure generator for extrusion of the honeycombed extrudates. In the case of components present in powder form (plasticizing agent and zeolite), the individual components of the reaction mixture are fed in via gravimetric metering units, and the liquids (water and binder) are fed in via membrane or piston pumps. Continuous production of the shaped bodies by the process according to the invention increases the profitability of the overall process considerably. This avoids having to transfer the kneaded reaction mixture to an extruder in an additional step. This step is expensive and, under certain circumstances, can lead to contamination of the kneaded reaction mixture and lead to changes in the rheological properties of the mixture after kneading (storage time).

The third step of the process according to the invention is preferably carried out at a temperature in the range from about 200° C. to about 250° C. If the calcining is carried out in this temperature range, compressive strengths of the shaped bodies which are significantly higher than in the case of calcining outside this temperature range are obtained. The sorptive and catalytic properties of the shaped bodies produced also have optimum values in this range.

Additional drying of the extrudates can of course be carried out between the second and third step of the process according to the invention.

The invention furthermore relates to the use of the shaped bodies according to the invention for drying, conditioning, purifying and separating gases, liquids and vapours. Shaped bodies used in such a way can be regenerated either by alternating pressure processes, heat treatment or cleaning with solvents and subsequent drying.

The zeolitic shaped bodies according to the invention can be used, for example, with a RotorAbsorber as a second stage for removal of residual moisture.

The zeolitic shaped bodies can likewise be used for drying compressed air. The moisture entering the compressed air system with fresh air condenses during compression/decompression and can impair functioning of the system due to subsequent corrosion. By incorporating the zeolitic shaped body according to the invention as an adsorbent, the water can thus be removed from air-brake system, pneumatic drives and controls, and corrosion can therefore be suppressed.

The shaped body according to the invention can furthermore be used in refrigerant drying in CFC-free refrigerating units. In this case, no regeneration of the shaped body according to the invention is necessary, since its capacity is ten to fifteen years. When a refrigerant system is closed during assembly, moisture is regularly introduced. By using the shaped body according to the invention for drying the refrigerant, the resulting disadvantages are avoided.

Drying and therefore recycling of spent refrigerant can be carried out with the aid of the shaped body according to the invention as an adsorber. Regeneration of the adsorber is achieved by a heat treatment.

These shaped bodies according to the invention can also be used for desulphurization (suppression of smell) of liquid hydrocarbons as spray can propellant gas (e.g. butane). Regeneration is irrelevant here.

A further application of the shaped bodies according to the invention is to be seen in air separation units, in which nitrogen is adsorbed and enrichment of oxygen, e.g. of respiratory air, takes place as a result. Regeneration can be carried out by heat.

The shaped body according to the invention can furthermore also be used in air-conditioning units. In these, the adsorption and evaporation enthalpies are utilized to generate heat or to cool.

Finally, the shaped bodies according to the invention can be employed as ion exchangers in water-softening units, in which the desired effect is achieved by a calcium-sodium exchange.

These and further advantages of the present invention are shown below with the aid of the examples and diagrams.

In the following examples, methylcellulose MC 1200 (Aqualon) is used as the plasticizing agent. A further constituent of the reaction mixture is water.

Methylsiloxane ether MSE 100 (blacker, marketed under the name SILRES™) is used as the binder. SILRES MSE 100 is the methyl ester of a mixture of various oligomeric methylsilicic acids and reacts by hydrolysis and condensation to give a hard silicone resin. This methylsiloxane ether corresponds to the formula (I) where n is 3 to 4, the radicals R being chiefly methyl radicals, The molecular weight is about 480 g/mol to about 600 g/mol. The solvent content of the methylsiloxane ether MSE 100 used in the examples is not more than 1.7%, but this methylsiloxane ether can also be obtained from blacker in solvent-free form. If MSE 100 is used as the binders it is not necessary to add silicone resins.

Figure 1:
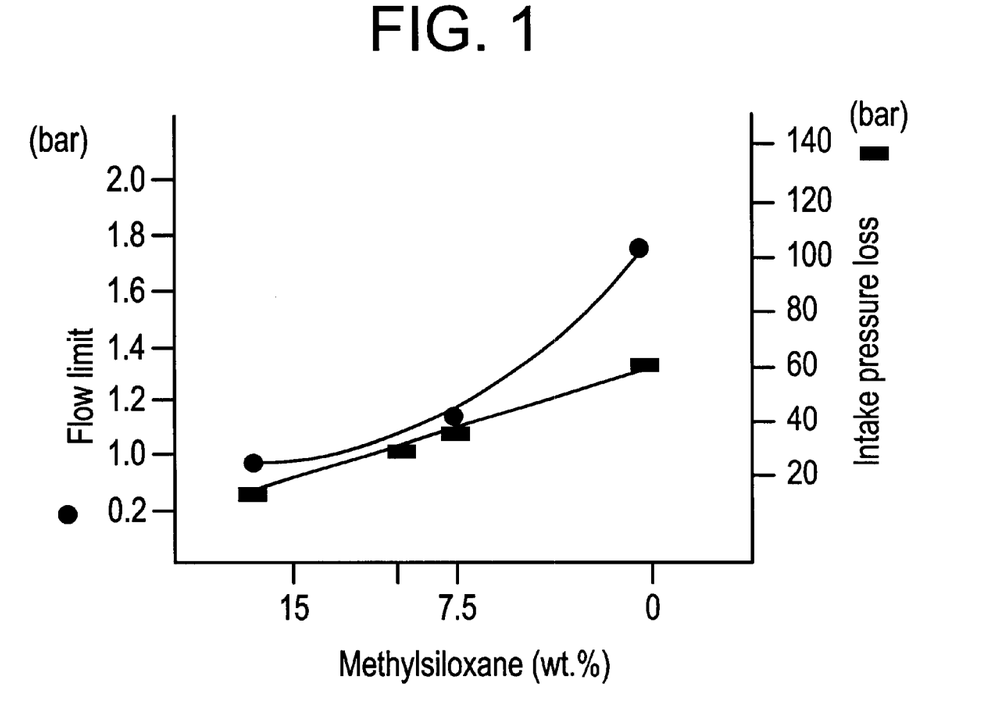
FIG. 1 illustrates the influence of methylsiloxane (% by weight) on the rheological parameters of flow limit and intake pressure (bar) loss.

The influence of the methylsiloxane ether MSE 100 on the rheological parameters of flow limit and intake pressure loss of the reaction mixture is shown in FIG. 1. Reaction mixtures without methylsiloxane ether have a high flow limit and an exceptionally high pressure loss in the intake region of the extruder. By admixing the methylsiloxane ether MSE 100, the deformation properties of the reaction mixture are improved decisively. At a content of about 15 wt. % methylsiloxane ether MSE 100, based on the amount of zeolite added, reduced values are obtained both for the flow limit and for the intake pressure loss. MSE 100 is therefore an outstanding lubricant and the reaction mixture requires no further addition of other lubricants. Furthermore, methylsiloxane ether MSE 100 advantageously does not crosslink during the compounding and shaping. Crosslinking takes place only in the calcining step.

An example of a general reaction mixture for the production of the shaped body according to the invention from a zeolite X type comprises 200 g of a zeolite X type, this containing 10 wt. % water, 10 to 40 g methylcellulose MC 12000, preferably 25 g, 10 to 90 g, preferably 20 g, methylsiloxane ether MSE 100 and 100 to 250 g water, preferably 170 g. If a zeolite X type with a lower or higher water content is used, correspondingly more or less water must be fed in. The amount of water added depends on the degree of loading of the zeolite powder used.

A general example of a reaction mixture for the production of shaped bodies according to the invention from a zeolite of the A type comprises 200 g zeolite of the A type, methylcellulose MC 12000 in a content of 10 to 40 g, preferably 25 g, methylsiloxane ether MSE 100 in a content of 10 to 80 g and a water content of 70 to 200 g, preferably 100 g, using zeolite powder with a water loading in the region of 18 wt. %, based on the total weight of the zeolite.

A tensile/pressure tester from Zwick, model UP 1455 was employed to determine the compressive strength. For this, completely cylindrical extrudates with a specimen diameter of 5 mm were cut to a specimen length of 7 mm. For exact and reproducible compressive strength measurements, it must be ensured that the front faces of the extrudates are planar-parallel. The measurement is carried out at room temperature. The preliminary force is 1 N. The experiments were carried out at a test speed of 1 mm/min. The test force acts on the front faces.

EXAMPLES

Example 1

A shaped body was produced from a reaction mixture comprising zeolite Nax in an amount of 200 g, methylcellulose MC 12000 in an amount of 25 g, methylsiloxane ether MSE 100 in an amount of 63 g MSE and water in a content of 160 g. The compounding and shaping to a honeycombed body were carried out in a twin-screw extruder ZSK 30 from Werner & Pfleiderer at a speed of rotation of 50 rpm, the barrel sections of the extruder having a temperature of 15° C. During processing, adequate cooling of the barrel sections must be ensured, since methylcellulose undergoes thermal gelling at temperatures above 40° C. and partly loses its water retention capacity. The shaped body produced in this way was calcined at a temperature of 225° C. for 60 min, without prior drying. It had a compressive strength of about 46.7 N/mm².

Figure 2:
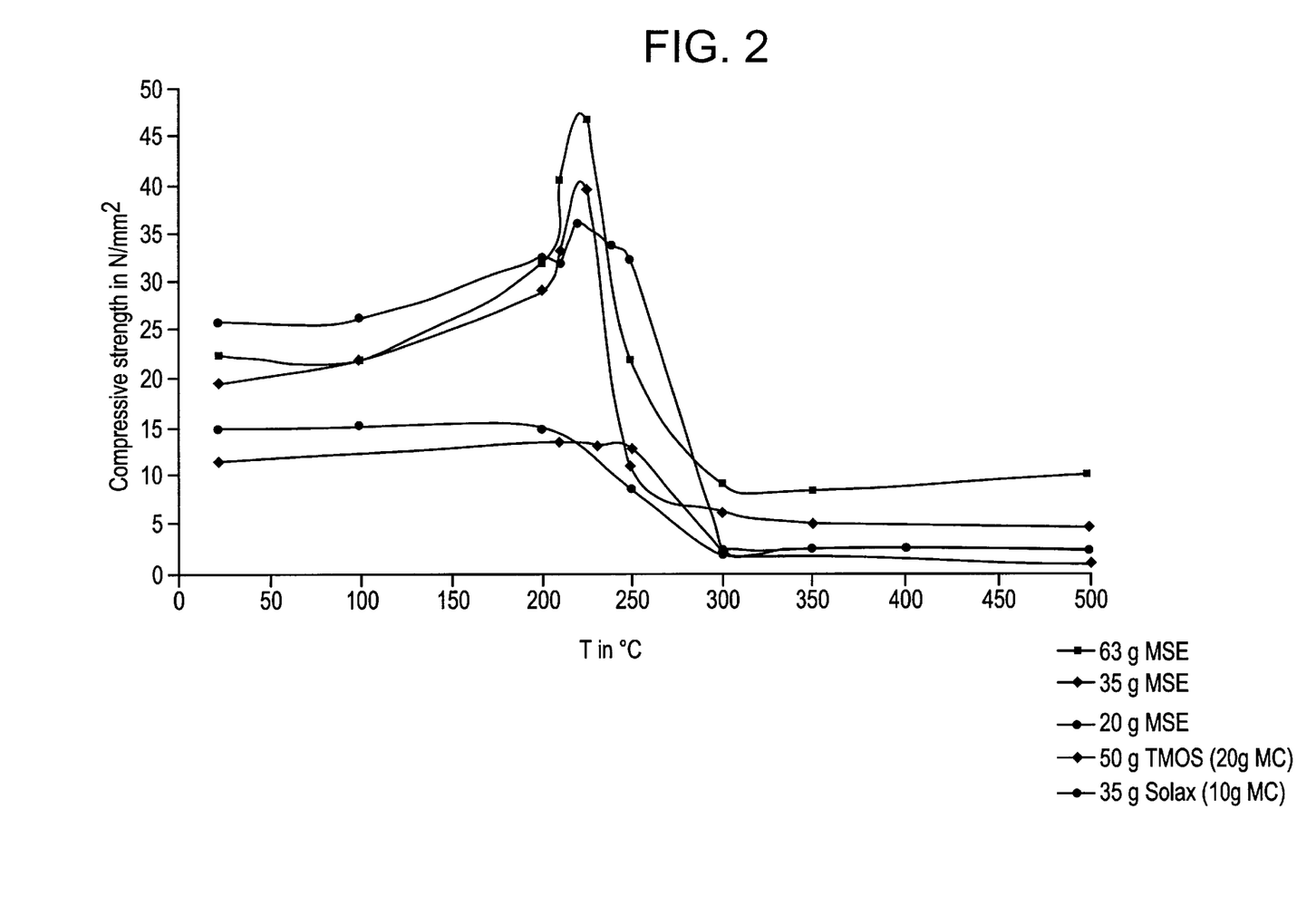
FIG. 2 illustrates compressive strengths at a range of temperatures (°C.) of the shaped bodies according to the invention produced from zeolite NaX.

The course of the compressive strength as a function of the calcining temperature is plotted in FIG. 2. For comparison, the dependence of the compressive strength on the calcining 30 temperature in a shaped body which comprises, instead of methylsiloxane ether MSE 100, attapulgite, a binder based on clay or tetramethyl orthosilicate (TMOS) is measured. The influence of an increased amount of methylsiloxane ether MSE 100 (35 g), with otherwise the same recipe, on the compressive strength is also shown. As can be seen from FIG. 2, the compressive strength has a compressive strength maximum in a range from 200 to 225° C. In the entire temperature range investigated, the compressive strengths of the shaped body are significantly higher than those of the shaped body produced using attapulgite or TMOS. At the maximum compressive strength of the shaped body, the compressive strength of the shaped body produced according to the invention exceeds that of the shaped body based on the clay binder or TMOS several-fold. Accordingly, if the methylsiloxane ether MSE 100 is used, significantly higher and excellent strength values with at the same time a lower binder content can be achieved compared with binders based on clay or TMOS. As a result, the content of adsorptively active zeolite in the shaped body can be increased and the adsorptive properties of the shaped bodies can therefore be increased.

Figure 3A:
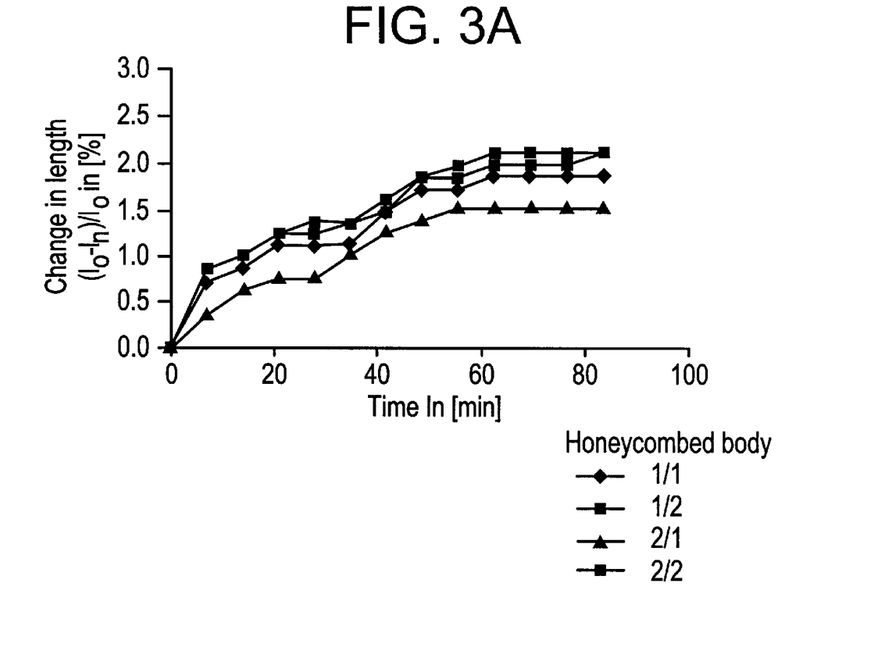
FIG. 3 is a series of graphs showing shrinkage (change in length) of honeycombed extrudates of zeolite NaX during drying at various microwave outputs (watts).
Figure 3B:
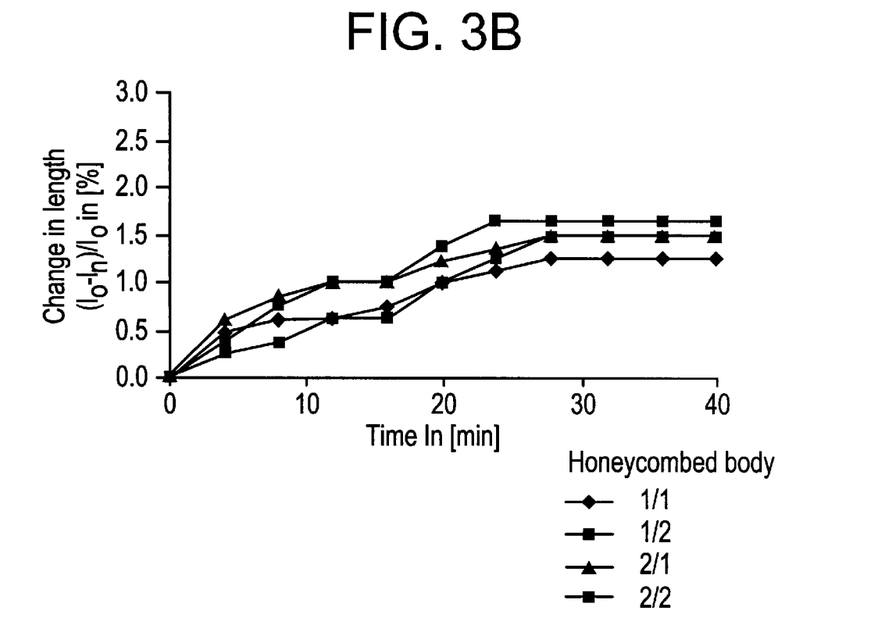
Figure 3C:
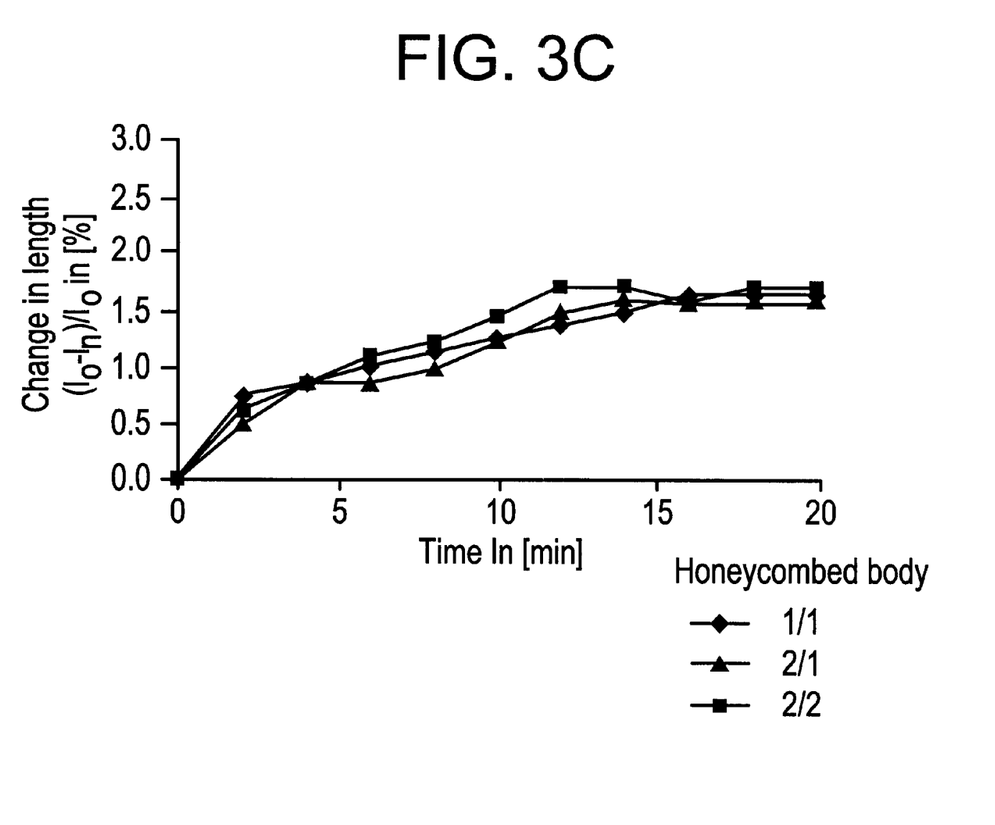

FIG. 3 shows the dependence of the change in length $(L_0-L_n)L_o$ of the honeycombed body produced according to example 1 in per cent as a function of time at various microwave outputs. In this figure, two honeycombed bodies 1 and 2 produced according to example 1 are measured at two different measurement points 1 and 2 which are rotated through 90° relative to one another (designation: honeycombed body 1, measured at measurement point 1: 1/1; honeycombed body 1, measured at measurement point 2: 1/2 etc.). The change in length is a measure of the shrinkage and the intrinsic stresses induced in the honeycombed body as a result. The extruded honeycombed bodies investigated have a cell density of 400 cells/inch$^2$ (about 62 cells/cm$^2$) and a square cross-section with an edge length of 40 mm. At a microwave output of 450 watt, no further change in length is observed after about 25 min. The change in length is not more than about 1.7%. In contrast, at a microwave output of 900 watt, a change in length is already no longer detectable after 12 min, and the maximum value for the change in length is likewise about 1.7%. These results show that the shaped body undergoes only minimal shrinkage during the drying step and the calcining. The intrinsic stresses caused by the shrinkage are compensated by the excellent mechanical compressive strengths. The shaped body has a smooth, crack-free surface.

Figure 4:
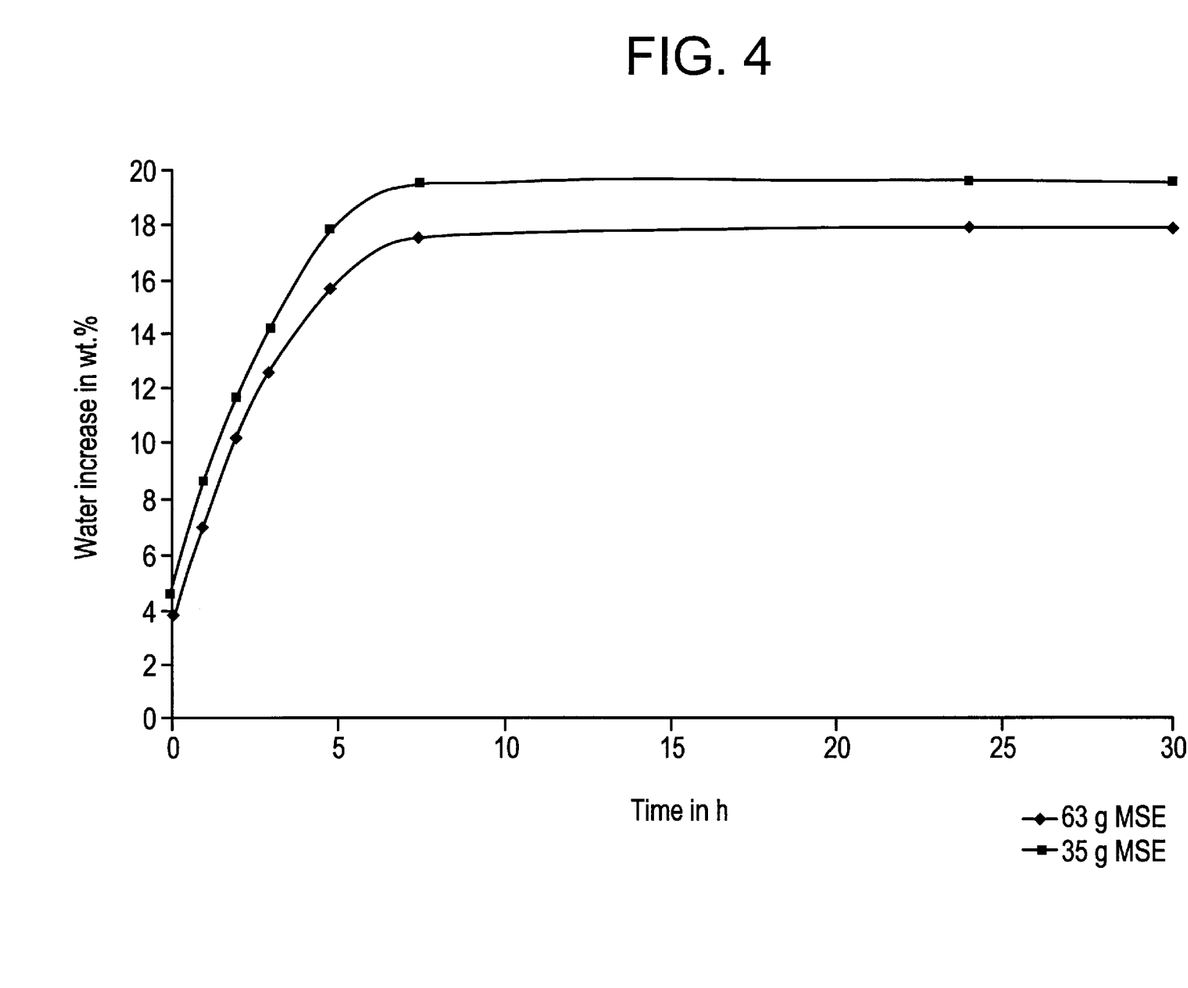
FIG. 4 illustrates adsorption properties over time (hours) of pellets produced from zeolite NaX.

The shaped body (NaX pellets) produced was characterized adsorptively by being exposed to a relative humidity of 50% and a defined temperature of 23° C. in a climate cabinet. The uptake of water by the zeolitic shaped body was measured via the increase in weight thereof. As a result, conclusions on the sorption capacity and the sorption kinetics of the extruded shaped body are possible. The shaped body was first activated at a temperature of 210° C. over a period of 2,500 min, and the measurement was then carried out. As can be seen clearly in FIG. 4, the shaped body has a loading with water of about 18 wt. %, based on the weight of the shaped body. A shaped body produced using 63 g methylsiloxane ether MSE 100, with otherwise the same recipe and process, has a loading of about 20 wt. % water. With both recipes, the loading maximum is reached after about 7.5 hours.

Example 2

A shaped body in the form of honeycombed bodies and pellets was produced using 200 g zeolite A with a water loading of 5 wt. %, based on the zeolite powder, 25 g methylcellulose MC 12000, 35 g methylsiloxane ether MSE 100 and 100 g water. This reaction mixture was extruded in a twin-screw extruder as described in example 1 at a temperature of 14° C. The shaped body was then calcined at 200° C. for 60 min in the case of production of honeycombed bodies and at 100° C., 200° C., 250° C., 300° C., 350° C. and 400° C. in the case of production of pellets. Honeycombed bodies with 400 cells/inch$^2$ (about 62 cells/cm$^2$) were produced.

Figure 5:
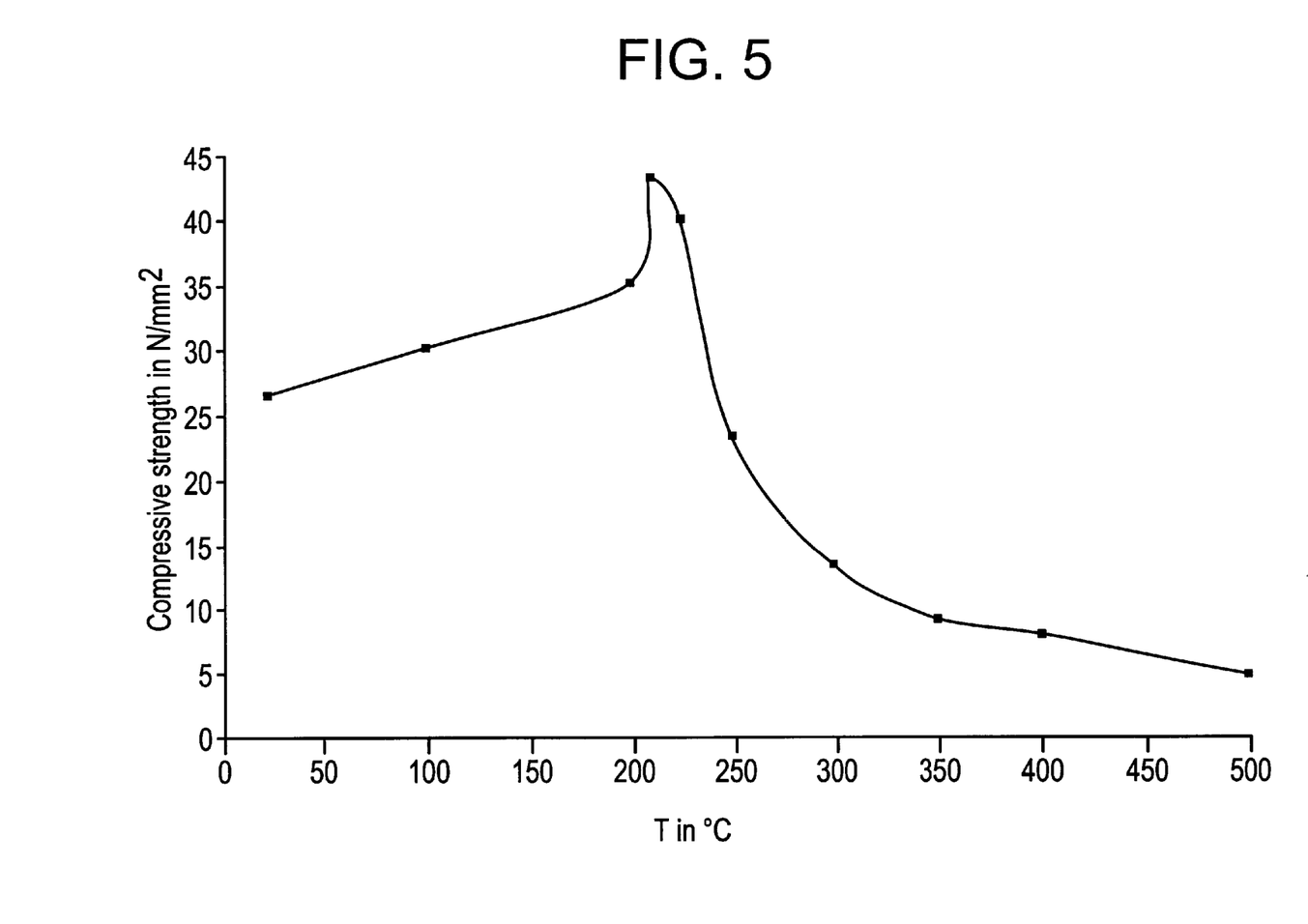
FIG. 5 shows compressive strengths ($N/mm^2$) of the shaped bodies at a range of temperatures (°C.) according to the invention produced from zeolite 4A.

As can be seen from FIG. 5, the shaped body produced in this way (pellet or honeycombed body) has a maximum compressive strength in a range between 200 and 225° C. Its maximum compressive strength is about 43 N/mm$^2$ at 210° C.

Figure 6:
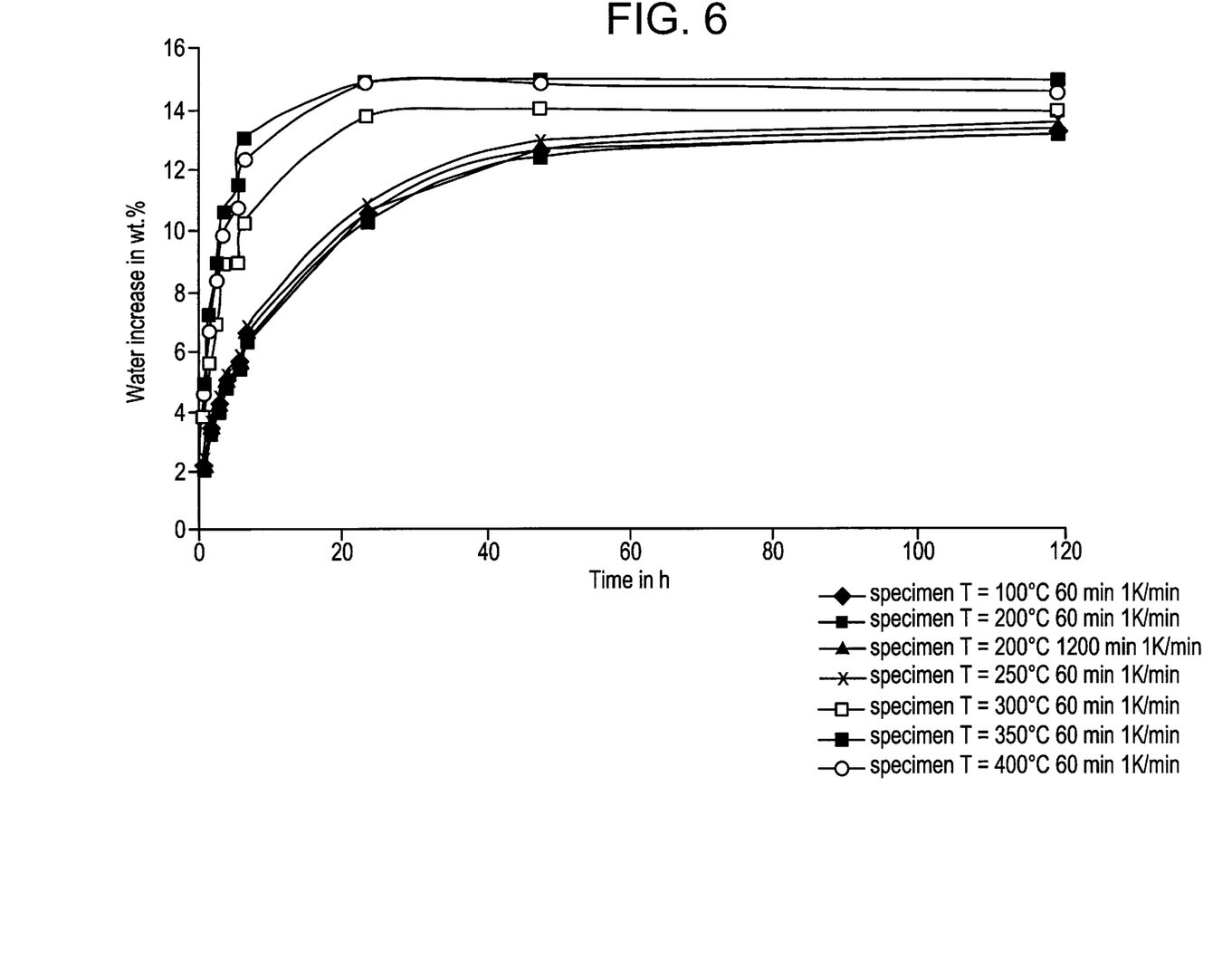
FIG. 6 shows adsorption properties of pellets at a range of temperatures (°C.) produced from zeolite 4A.

The adsorption properties of the resulting pellets are shown in FIG. 6. The measurements were carried out at a temperature of 23° C. and a relative humidity of 50%. Various adsorption curves were recorded at different calcining temperatures of the pellets. The activation was carried out at 200° C. over an activation time of 60 minutes. As can be seen from FIG. 6, the samples calcined under different conditions show a maximum value of the loading with water after about 50 hours. In the case of calcining at 400° C., the maximum loading is about 15 wt. % water, based on the total weight of the shaped body. However, shaped bodies calcined at such temperatures have relatively poor mechanical properties, in particular compressive strength values. Specimens calcined at 250° C. show a loading with water in the region of about 13 wt. %, based on the total weight of the shaped body.

Figure 7:
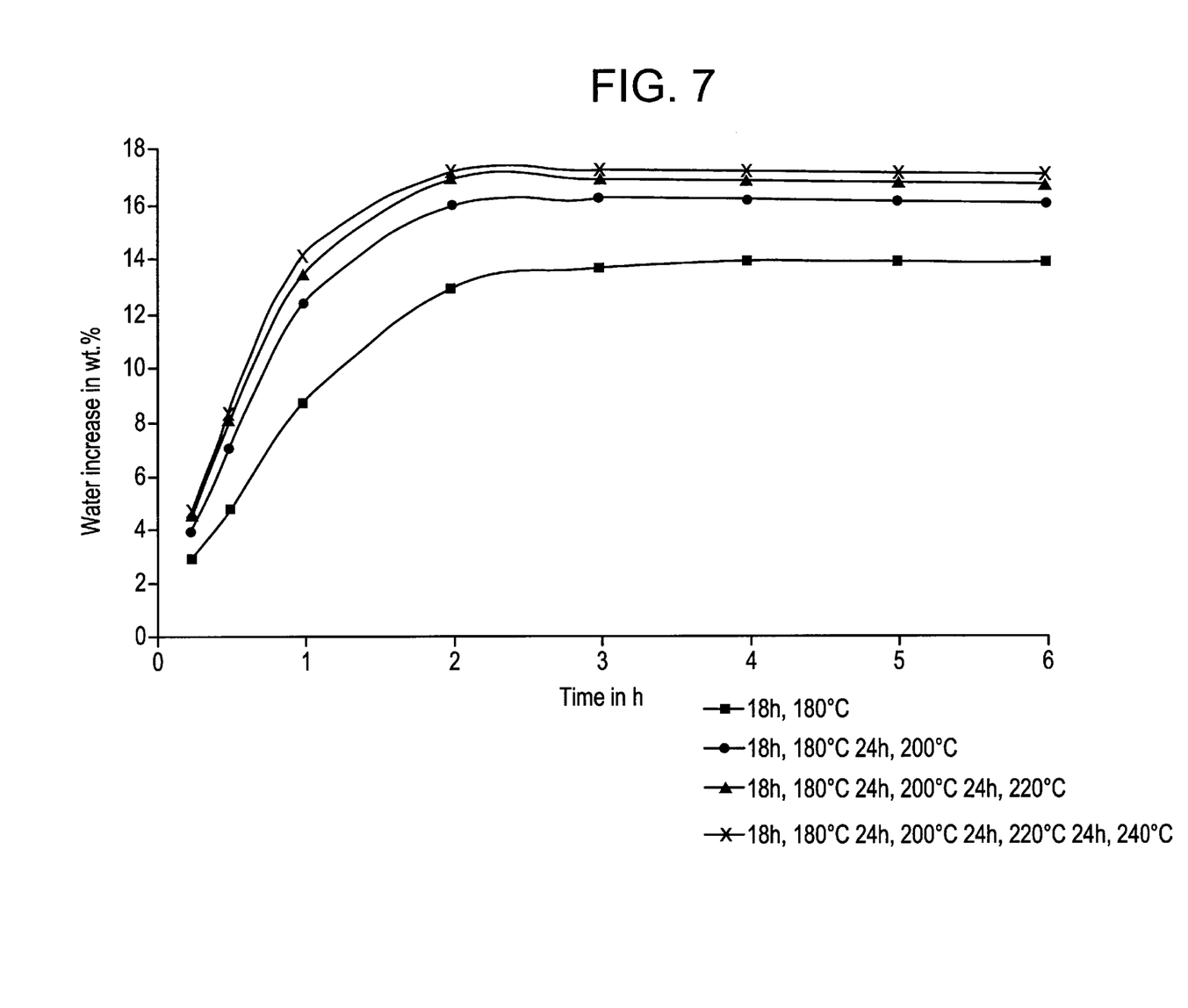
FIG. 7 shows adsorption properties of honeycombed extrudates at a range of temperatures (°C.) produced from zeolite 4A.

FIG. 7 shows the adsorption properties of the honeycombed body produced according to example 2. The maximum loading of the zeolitic honeycombed body with water is already reached after 3 hours. The loading is between about 14 and about 17 wt. % water, based on the total weight of the shaped body, depending on the activation parameters (between one activation for 18 hours at 180° C. to activation four times at between 180° C. and 240° C. over 18 and 24 hours). Compared with FIG. 6, it is found that the honeycomb-shaped extrudate has significantly improved kinetics compared with the pellets because of its greater surface area.

Figure 8:
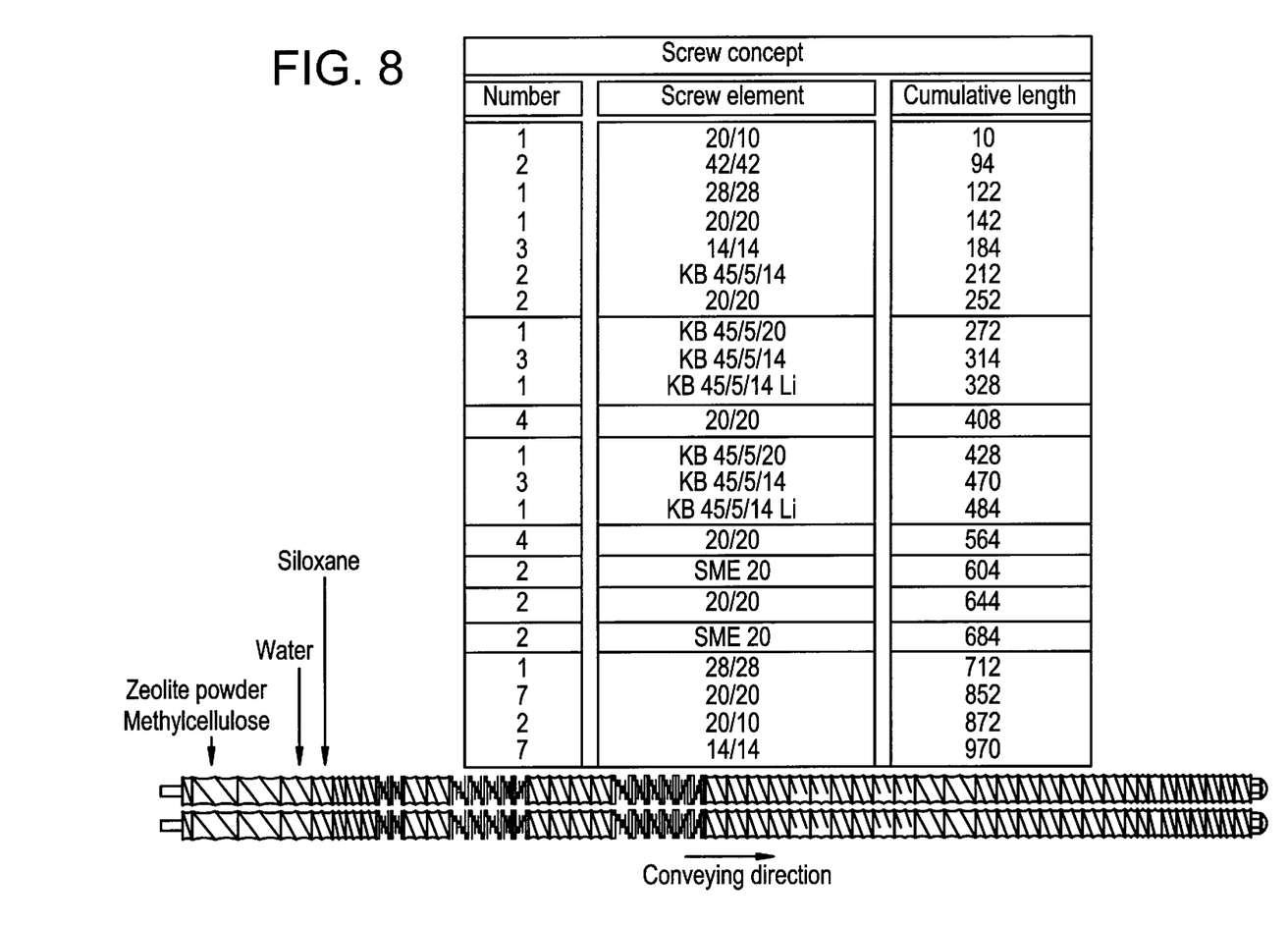
FIG. 8 shows a screw concept for a continuous process procedure.

FIG. 8 shows an example of a screw concept for the continuous process according to the invention for the production of zeolitic shaped bodies (KB: kneading block, SME: screw mixing element). Using such a screw concept, the zeolitic shaped bodies are inexpensive and simple to produce, since the preparation of the reaction mixture, which as a general rule takes place by kneading the mixture, and the extrusion of this reaction mixture are carried out continuously.

What is claimed is:

1. Shaped body obtained from a reaction mixture comprising zeolite plasticizing agent and binder, characterized in that
   the binder comprises a compound of the formula (I)

in which
   R in each case independently is unsubstituted or substituted alkyl, aryl, alkenyl, alkinyl, alkoxy or phenoxy,
   R' in each case independently is unsubstituted or substituted alkyl, aryl, alkenyl or alkinyl and
   n is a number from 1 to 10,
   the zeolite comprises zeolite 3A, zeolite 4A, zeolite 5A or zeolite X or any desired mixture of the above-mentioned types of zeolite, and
   the plasticizing agent comprises methylcellulose and is present in the reaction mixture in a content of about 5 to about 40 wt. %, based on the total reaction mixture.

2. Shaped body according to claim 1, characterized in that the binder has an SiO$_2$ content of about 50% or more based on the total binder.

3. Shaped body according to claim 1, characterized in that the binder has an SiO$_2$ content of about 60% or more based on the total binder.

4. Shaped body according to claim 1, characterized in that the binder comprises less than about 10 wt. %, based on the total binder, of solvent.

5. Shaped body according to claim 2, characterized in that the binder comprises less than about 10 wt. %, based on the total binder, of solvent.

6. Shaped body according to claim 1, characterized in that the binder comprises silicone resin.

7. Shaped body according to claim 6, characterized in that the silicone resin is solvent-free.

8. Shaped body according to claim 6, characterized in that the silicone resin has a particle size of about 1 µm to about 10 µm.

9. Shaped body according to claim 7, characterized in that the silicone resin has a particle size of about 1 µm to about 10 µm.

10. Shaped body according to claim 1, characterized in that the shaped body has a compressive strength of about 20 N/mm² or higher.

11. Shaped body according to claim 2, characterized in that it has been produced at a temperature in a range from about 180° C. to about 280° C.

12. Shaped body according to claim 11, characterized in that the binder comprises silicone resin.

13. Shaped body according to claim 12, characterized in that the silicone resin is solvent-free.

14. Shaped body according to claim 12, characterized in that the silicone resin has a particle size of about 1 µm to about 10 µm.

15. Shaped body according to claim 1, characterized in that the plasticizing agent further comprises cellulose ether, polysaccharide, polyvinyl alcohol, starch or any mixture of the above mentioned compounds.

16. Shaped body according to claim 15, characterized in that the binder comprises silicone resin.

17. Shaped body according to claim 1, characterized in that the reaction mixture comprises wax emulsions, fatty-acid mixture or mixtures thereof as lubricants.

18. Shaped body according to claim 17, characterized in that the binder comprises silicone resin.

19. Shaped body according to claim 17, characterized in that the plasticizing agent further comprises cellulose ether, polysaccharide, polyvinyl alcohol, starch or any mixture of the above mentioned compounds.

20. Shaped body according to claim 1, characterized in that the reaction mixture comprises the binder in a content of about 1 to about 35 wt. %, the zeolite in a content of about 40 to about 90 wt. % and the plasticizing agent in a content of about 5 to about 40 wt. %, in each case based on the total reaction mixture.

21. Shaped body according to claim 1, characterized in that the compound of the formula (I) is present in the reaction mixture in a content of about 2 to about 25 wt. % based on the reaction mixture.

22. Shaped body according to any one of claims 1–5, 10, 15, 19 and 20 characterized in that it is a honeycombed body.

23. Process for the production of a shaped body of a reaction mixture comprising zeolite, plasticizing agent and binder of the formula (I)

in which

R in each case independently is unsubstituted or substituted alkyl, aryl, alkenyl, alkinyl, alkoxy or phenoxy, R' in each case independently is unsubstituted or substituted alkyl, aryl, alkenyl or alkinyl and n is a number from 1 to 10, the zeolite comprises zeolite 3A, zeolite 4A, zeolite 5A or zeolite X or any desired mixture of the above-mentioned types of zeolite, and the plasticizing agent comprises methylcellulose and is present in the reaction mixture in a content of about 5 to about 40 wt. %, based on the total reaction mixture, wherein the process comprises the following steps:

(a) preparing a reaction mixture of zeolite, plasticizing agent and binder;

(b) extruding said reaction mixture; and (c) calcining the extrudate at a temperature in a range from about 180° C. to about 280° C.

24. Process according to claim 23, characterized in that (a) and (b) are carried out continuously.

25. Process according to one of claim 23, characterized in that (c) is carried out at a temperature in a range from about 200° to about 250° C.

26. Use of a shaped body according to claim 1, for drying gases.

27. Use according to claim 26 characterized in that the shaped body is regenerated by a heat treatment or by an alternating pressure process.

28. Use according to claim 26 in which the shaped body is honeycombed.

29. Use of a shaped body according to claim 1 for drying liquids and vapors.

30. Use according to claim 29 wherein the shaped body can be regenerated by heat, and is used in the processing of refrigerants.

31. Use according to claim 29 wherein the shaped body is employed in a non-regenerative operating procedure.

32. Use according to claim 31 wherein the shaped body is employed in the drying of refrigerant in a closed circulation.

33. Use of a shaped body according to claim 1 for desulfurization of gases.

34. Use according to claim 33 wherein the shaped body is used for desulfurization of propellants for spray cans.

35. Use according to claim 34 wherein the propellant is butane.

36. Use of a shaped body according to claim 1 as a nitrogen adsorber in an air separation unit.

37. Use according to claim 36 wherein the air separation unit generates oxygen-enriched air.

38. Use of a shaped body according to claim 1 in air-conditioning units as an adsorber/desorber, wherein the adsorption and evaporation enthalpies are utilized for heating and cooling.

39. Use of a shaped body according to claim 1 in water-softening units which operate by the principle of calcium-sodium ion exchange.

40. Shaped body according to claim 1, characterized in that the shaped body has a compressive strength of about 30 N/mm² or higher.

41. Shaped body according to claim 1, characterized in that the compound of the formula (I) is present in the reaction mixture in a content of about 5 to about 20 wt. %, based on the reaction mixture.

* * * * *

UNITED STATES PATENT AND TRADEMARK OFFICE
CERTIFICATE OF CORRECTION

PATENT NO. : 6,458,187 B1  Page 1 of 1
DATED : October 1, 2002
INVENTOR(S) : Fritz et al.

It is certified that error appears in the above-identified patent and that said Letters Patent is hereby corrected as shown below:

<u>Column 13,</u>
Line 55, "1-5" should be -- 1-6 --.

Signed and Sealed this

Eighteenth Day of March, 2003

JAMES E. ROGAN
*Director of the United States Patent and Trademark Office*